(12) United States Patent
George et al.

(10) Patent No.: US 10,867,387 B2
(45) Date of Patent: Dec. 15, 2020

(54) METHOD AND SYSTEM FOR PROCESSING SCANNED IMAGES

(71) Applicant: General Electric Company, Schenectady, NY (US)

(72) Inventors: Sheri George, Bangalore (IN); Haribaskar Govindasamy, Bangalore (IN); Andre Leon Maitre, Dauphin, PA (US); Mark Francis Mcanally, Lewistown, PA (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 16/226,152

(22) Filed: Dec. 19, 2018

(65) Prior Publication Data

US 2019/0122368 A1   Apr. 25, 2019

Related U.S. Application Data

(63) Continuation of application No. 15/118,491, filed as application No. PCT/US2015/014432 on Feb. 4, 2015, now Pat. No. 10,163,217.

(30) Foreign Application Priority Data

Feb. 17, 2014   (IN) ............................ 0737/CHE/2014

(51) Int. Cl.
*G06T 5/00* (2006.01)
*G06T 7/136* (2017.01)
(Continued)

(52) U.S. Cl.
CPC ............ *G06T 7/136* (2017.01); *G06K 9/3233* (2013.01); *G06K 9/38* (2013.01); *G06K 9/4604* (2013.01);
(Continued)

(58) Field of Classification Search
CPC ............ G06K 9/00–82; G06K 2209/05; G06T 7/00–97; G06T 2207/10116–10128; G06T 2207/30004
See application file for complete search history.

(56) References Cited

U.S. PATENT DOCUMENTS 4,975,580 A * 12/1990 Ohgoda ............... G03B 42/045
                                                     250/589
5,138,161 A *  8/1992 Miyagawa ........... H04N 1/0281
                                                     250/586
(Continued)

OTHER PUBLICATIONS

Jain, AK., "Fundamentals of Digital Image Processing," Selected Excerpts, Prentice Hall, pp. 1-6 (1989).
(Continued)

*Primary Examiner* — Sean T Motsinger
(74) *Attorney, Agent, or Firm* — Mintz Levin Cohn Ferris Glovsky and Popeo, P.C.

(57) ABSTRACT

A method of locating content portion(s) of an image includes automatically determining a pixel threshold value; comparing the threshold value to the image to determine background and content sets of the pixels; determining boundaries between the background and content sets; determining the content portions using the determined boundaries; and determining bounding boxes for the content portions. A computed-radiography scanner includes an imager; a transport configured to operatively arrange a plurality of plates with respect to the imager so that a single image of the plates can be captured; and a processor configured to automatically locate the content portion(s) in the single image. A locating method includes automatically determining the pixel threshold value; determining the boundaries between portions delimited by the pixel threshold value; determining the content portions using the boundaries; and determining the bounding boxes.

19 Claims, 9 Drawing Sheets

(51) Int. Cl.
  *G06T 7/12* (2017.01)
  *G06T 7/194* (2017.01)
  *G06K 9/32* (2006.01)
  *G06K 9/38* (2006.01)
  *G06K 9/46* (2006.01)

(52) U.S. Cl.
  CPC ............... *G06T 7/12* (2017.01); *G06T 7/194* (2017.01); *G06K 2209/05* (2013.01); *G06T 2207/10116* (2013.01); *G06T 2207/30004* (2013.01)

(56) References Cited

U.S. PATENT DOCUMENTS

| | | | |
|---|---|---|---|
| 5,729,927 A | 3/1998 | Shaver, Jr. | |
| 6,035,056 A * | 3/2000 | Karssemeijer | G06K 9/4633 378/37 |
| 6,180,955 B1 * | 1/2001 | Doggett | G03B 42/02 250/584 |
| 6,222,642 B1 | 4/2001 | Farrell et al. | |
| 6,355,938 B1 * | 3/2002 | Cantu | G03B 42/02 250/584 |
| 6,528,811 B1 * | 3/2003 | Arakawa | G03B 42/02 250/586 |
| 6,894,303 B2 | 5/2005 | Livingston | |
| 7,244,955 B2 | 7/2007 | Bueno et al. | |
| 7,358,502 B1 * | 4/2008 | Appleby | G03B 42/04 250/370.14 |
| 2001/0028047 A1 * | 10/2001 | Isoda | G01T 1/2014 250/586 |
| 2002/0181797 A1 * | 12/2002 | Young | G06T 5/009 382/260 |
| 2003/0038993 A1 * | 2/2003 | Tseng | H04N 1/3878 358/504 |
| 2004/0028174 A1 * | 2/2004 | Koren | G06F 19/3418 378/4 |
| 2004/0119747 A1 * | 6/2004 | Walker | G06F 3/0481 715/764 |
| 2005/0163374 A1 | 7/2005 | Ferman et al. | |
| 2006/0251302 A1 * | 11/2006 | Abufadel | G06T 7/149 382/128 |
| 2007/0002034 A1 * | 1/2007 | Hakamata | H04N 1/02815 345/204 |
| 2007/0076938 A1 * | 4/2007 | Hartman | G06T 7/0012 382/132 |
| 2007/0138419 A1 * | 6/2007 | Bueno | G01T 1/2014 250/586 |
| 2007/0160295 A1 * | 7/2007 | Wang | G06K 9/00456 382/199 |
| 2007/0236755 A1 * | 10/2007 | Liao | H04N 1/12 358/488 |
| 2008/0075228 A1 | 3/2008 | Tasaki | |
| 2008/0137954 A1 | 6/2008 | Tang et al. | |
| 2009/0078874 A1 * | 3/2009 | Schweizer | G01T 1/2012 250/363.02 |
| 2009/0129660 A1 * | 5/2009 | Gregson | G06T 7/12 382/133 |
| 2009/0257658 A1 * | 10/2009 | Fukunaga | H04N 1/3873 382/199 |
| 2010/0302564 A1 * | 12/2010 | Ozawa | G06K 15/1852 358/1.9 |
| 2011/0122138 A1 * | 5/2011 | Schmidt | G06K 9/6253 345/440 |
| 2011/0255791 A1 * | 10/2011 | Abdo | G06T 1/60 382/199 |
| 2012/0236998 A1 * | 9/2012 | Berger | A61B 6/4411 378/182 |
| 2012/0250974 A1 * | 10/2012 | Miyamoto | A61B 6/504 382/132 |
| 2014/0219500 A1 * | 8/2014 | Moehrle | G16H 30/20 382/103 |
| 2014/0304271 A1 * | 10/2014 | Lu | G06T 7/90 707/740 |
| 2015/0256697 A1 * | 9/2015 | Kosaka | H04N 1/00824 358/448 |
| 2016/0014392 A1 * | 1/2016 | Liang | G06K 9/00201 348/47 |
| 2017/0301081 A1 * | 10/2017 | Yang | G06T 7/11 |
| 2017/0309021 A1 * | 10/2017 | Barnes | G06T 7/0012 |
| 2018/0120689 A1 * | 5/2018 | Weber | G02B 27/026 |

OTHER PUBLICATIONS

Russ, J.C., "The Image Processing Handbook," Fourth Edition, pp. 1-12 (2002).
Partial Supplementary European Search Report and Opinion issued in connection with corresponding EP Application No. 15792785.6 dated Sep. 22, 2017.
International Search Report issued in connection with corresponding Application No. PCT/US15/14432 dated May 14, 2015.

\* cited by examiner

METHOD AND SYSTEM FOR PROCESSING SCANNED IMAGES

CROSS-REFERENCE TO RELATED APPLICATIONS

This application is a continuation of U.S. patent application Ser. No. 15/118,491, entitled "METHOD AND SYSTEM FOR PROCESSING SCANNED IMAGES," filed on Aug. 12, 2016, which is a national stage application, filed under 35 U.S.C. § 371, of International Application No. PCT/US2015/014432, filed on Feb. 4, 2015, and claims the benefit of, and priority to, IN Patent Application No. 0737/CHE/2014, filed on Feb. 17, 2014, each of which is incorporated by reference herein in its entirety.

TECHNICAL FIELD

The subject matter disclosed herein relates to methods for processing images and systems for performing such processing, and particularly to processing of such images provided by computed-radiography scanners.

BACKGROUND

Radiography is an imaging technique that uses X-rays to view inner structure of non-uniformly composed material, such as, for example, a human body. By projecting a beam of X-rays produced by an X-ray source at an object, an image of the object can be developed that clearly displays areas of differing density and composition. Based upon the density and composition of the differing areas of the object, some portion of the projected X-rays is absorbed by the object. The X-rays that pass through are then captured behind the object by a detector, a film sensitive to X-rays, which will create a two-dimensional representation of the object's structures.

Computed radiography (CR) is one form of radiography and uses similar equipment to conventional radiography except that in place of film to create an image, an imaging plate formed of a photostimulable phosphor is used. The imaging plate is generally housed in a special cassette, which can be flexible. The cassette is placed under the object to be examined, or otherwise on the opposite side of the object from an X-ray source, and the X-ray exposure is performed. This forms a latent image in the phosphor. The imaging plate is then passed through a laser scanner or other computed radiography (CR) scanner. The CR scanner reads and digitizes the latent image. Unlike conventional X-ray film, the latent image on a CR imaging plate can be erased following a read, making it ready for reuse. Throughout the remainder of this document, the terms "film" and "plate" are used interchangeably to refer to CR imaging plates.

CR scanners often use standard film sizes, e.g., 8"×10" (~20 cm×~25 cm) or 14"×17" (~35.5 cm×~43 cm). However, CR scanners are not restricted to these sizes. Particularly for industrial applications such as weld inspection, plates can be, e.g., 2" to 4" (~5-10 cm) wide and up to, e.g., 36" (~91 cm) long. Such plates can be wrapped around, e.g., a welded pipe joint, and the X-ray source can be placed inside the pipe or to the side of the pipe for exposure. Other commercial and industrial plates have small sizes for imaging small objects such as small castings.

A CR latent image can last several weeks without substantial degradation. In some situations, therefore, multiple CR plates are exposed to X-rays in a batch, and then the plates are read in a batch. This permits imaging objects in harsh environments such as northern Alaska without requiring the CR scanner be operated in the harsh environment. CR plates can be exposed in situ, and reading can be performed using a CR scanner at a separate location. Accordingly, in batch processing, there is an ongoing need for ways of permitting many plates to be scanned at once to reduce the total time required to scan the entire batch. There is also a continuing need for ways of reducing total time in the presence of plates of various sizes and aspect ratios.

The discussion above is merely provided for general background information and is not intended to be used as an aid in determining the scope of the claimed subject matter.

BRIEF DESCRIPTION

A method of locating content portion(s) of an image includes automatically determining a pixel threshold value; comparing the threshold value to the image to determine background and content sets of the pixels; determining boundaries between the background and content sets; determining the content portions using the determined boundaries; and determining bounding boxes for the content portions. A computed-radiography scanner includes an imager; a transport configured to operatively arrange a plurality of plates with respect to the imager so that a single image of the plates can be captured; and a processor configured to automatically locate the content portion(s) in the single image. A locating method includes automatically determining the pixel threshold value; determining the boundaries between portions delimited by the pixel threshold value; determining the content portions using the boundaries; and determining the bounding boxes.

A potential benefit that may be realized in the practice of some disclosed embodiments of the method is identification of content regions in an image, e.g., a scan of multiple CR plates. This permits increasing throughput of batch plate-scanning and can save processing time and storage space.

In one embodiment, a method of locating one or more content portions of an image is disclosed, the image including a plurality of pixel values. The method includes automatically performing the following steps using a processor: determining a pixel threshold value using the pixel values so that the pixel threshold value corresponds to a background range of the pixel values; comparing the determined pixel threshold value to the pixel values so that a background set of the pixel values and a content set of the pixel values are determined; determining a plurality of boundaries between the background and content sets of pixel values; determining the one or more content portions using the determined boundaries; and determining respective bounding boxes for the determined one or more content portions.

In another embodiment, a computed-radiography scanner is disclosed. The scanner includes an imager; a transport configured to operatively arrange a plurality of plates with respect to the imager so that a single image of the plates can be captured; and a processor configured to automatically: determine a pixel threshold value using a plurality of pixel values in the single image so that the pixel threshold value corresponds to a background range of the pixel values; compare the determined pixel threshold value to the pixel values so that a background set of the pixel values and a content set of the pixel values are determined; determine a plurality of boundaries between the background and content sets of pixel values; determine the one or more content portions using the determined boundaries; and determine respective bounding boxes for the determined one or more content portions.

In still another embodiment, a method of locating one or more content portions of an image is disclosed, the image including a plurality of pixel values. The method includes automatically performing the following steps using a processor: determining a pixel threshold value using the pixel values; determining a plurality of boundaries between portions in the image data, the portions delimited by the pixel threshold value; determining the one or more content portions using the determined boundaries; and determining respective bounding boxes for the determined one or more content portions.

This brief description is intended only to provide a brief overview of subject matter disclosed herein according to one or more illustrative embodiments, and does not serve as a guide to interpreting the claims or to define or limit the scope of the application, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features can be understood, a detailed description may be had by reference to certain embodiments, some of which are illustrated in the accompanying drawings. It is to be noted, however, that the drawings illustrate only certain embodiments and are therefore not to be considered limiting of its scope, for the scope of the application encompasses other equally effective embodiments. The drawings are not necessarily to scale, emphasis generally being placed upon illustrating the features of certain embodiments. In the drawings, like numerals are used to indicate like parts throughout the various views. Thus, for further understanding of the embodiments, reference can be made to the following detailed description, read in connection with the drawings in which.

DETAILED DESCRIPTION

In the following description, some aspects will be described in terms that would ordinarily be implemented as software programs. Those skilled in the art will readily recognize that the equivalent of such software can also be constructed in hardware (hard-wired or programmable), firmware, or micro-code. Accordingly, aspects of the present application may take the form of an entirely hardware embodiment, an entirely software embodiment (including firmware, resident software, or micro-code), or an embodiment combining software and hardware aspects. Software, hardware, and combinations can all generally be referred to herein as a "service," "circuit," "circuitry," "module," or "system." Various aspects can be embodied as systems, methods, or computer program products. Because data manipulation algorithms and systems are well known, the present description will be directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1:
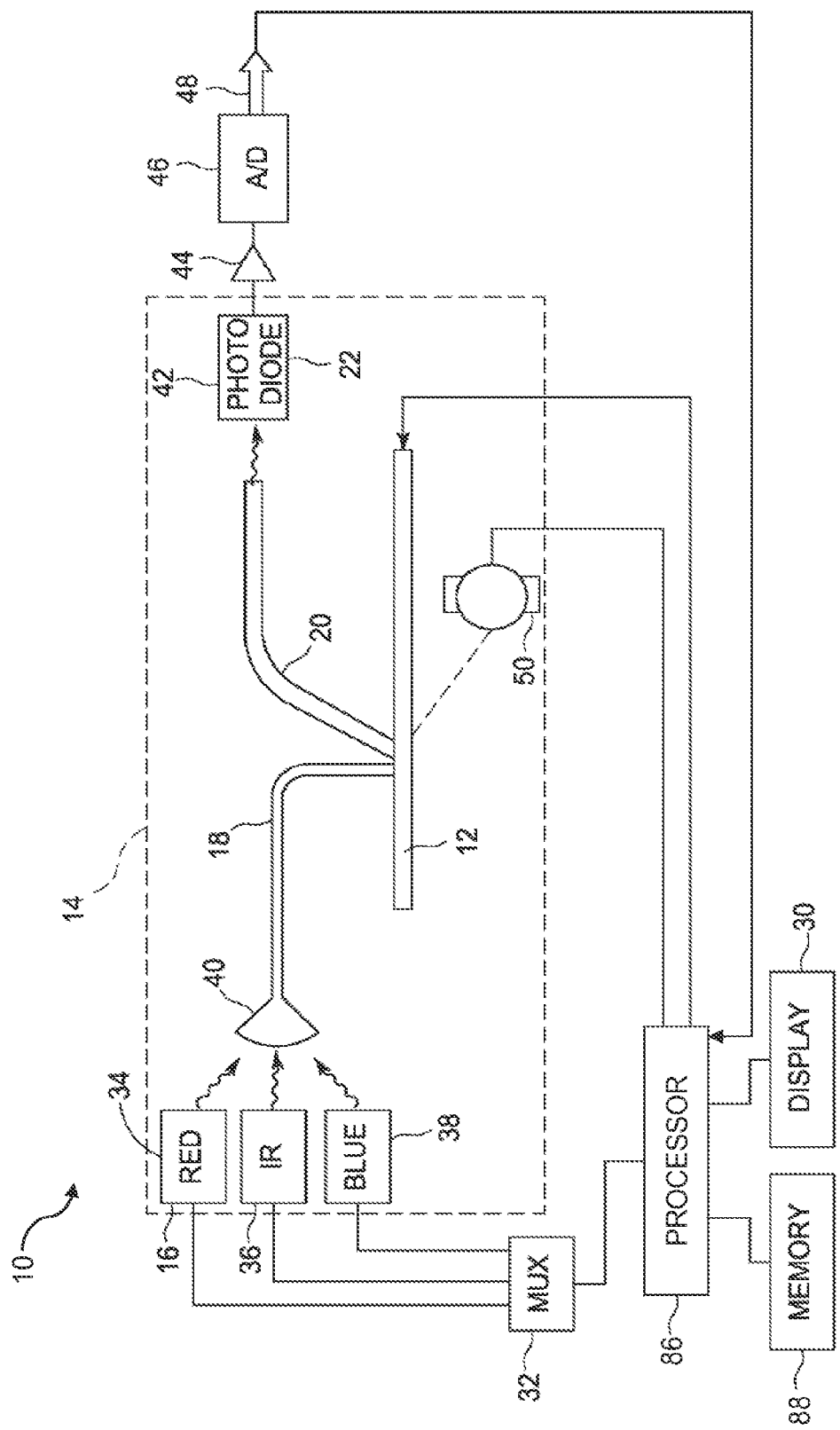
FIG. 1 is a schematic diagram of an exemplary computed radiography (CR) scanning system.

FIG. 1 illustrates a conventional computed radiography (CR) scanning system 10. The CR scanning system 10 includes an optical source 16, a CR plate 12 (e.g., a plate carrying a latent image), a photomultiplier 42, and a processor 86. The optical source 16 produces light to be delivered to the CR plate 12 to generate phosphorescence in response to a latent X-ray image formed therein. The pumped light is carried to the vicinity of the CR plate 12 by a plurality of optical fibers 18. The optical source 16 can include a laser that provides the photostimulation.

A housing (not shown) holds defines a light-tight enclosure 14, which holds the exposed computed radiography plate 12 during a scanning operation. A processor 86, which can be located within the housing or apart therefrom, controls the operation of the optical source 16 through a multiplexer 32. Specifically, the multiplexer 32, under direction from the processor 86, selectively energizes a red light-emitting diode 34, an infrared light-emitting diode 36, and a blue light-emitting diode 38. The multiplexer 32 can energize the diodes 34, 36, 38 one at a time or simultaneously. The purpose of energizing the diodes 34, 36, 38 is to transmit light to a lensing body 40 of the plurality of optical fibers 18 for delivery to the CR plate 12. In various embodiments, a stepper motor 50 moves the CR plate 12 past the optical fibers 18, 20 to be scanned.

In an example, phosphorescent blue light is emitted from the CR plate 12 and is captured in the second plurality of optical fibers 20. Alternatively, a light pipe can be used in place of the optical fibers 20. An optical receiver 22, including the photomultiplier 42, converts the phosphorescent light received from the optical fibers 20 to an electrical image signal. An operational amplifier amplifies the electrical image signal and feeds an amplified analog received phosphorescent light signal to an analog-to-digital converter 46, which provides a digital output signal 48. The processor 86 can produce a digital image corresponding to the digital output signal 48 and display the digital image, e.g., on display 30, which can be located within the housing or apart therefrom.

Figure 2:
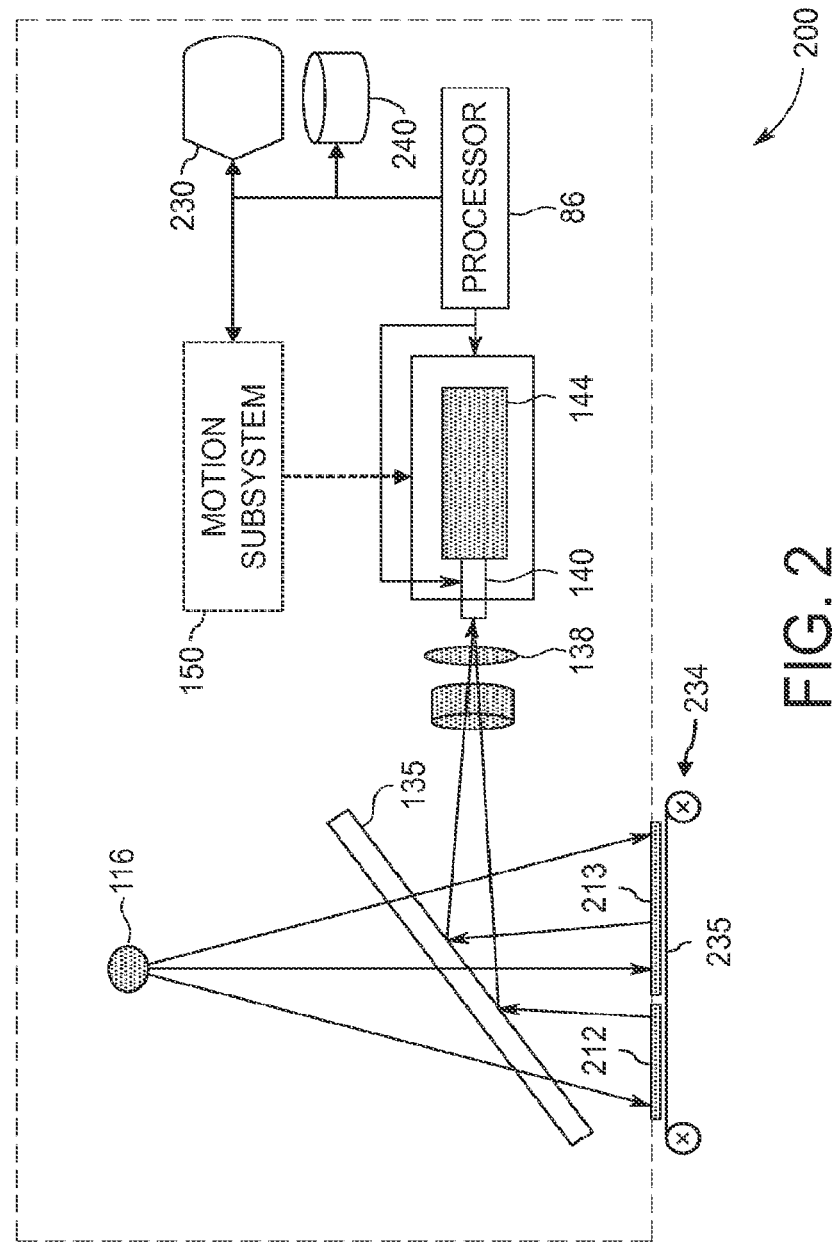
FIG. 2 is a schematic diagram of an exemplary computed radiography (CR) scanning system according to various aspects.

FIG. 2 illustrates CR scanner 200, e.g., a CR scanning system. CR plate 212 has a latent image storing radiation energy from a source. Illumination source 116, which can be a laser or a broad illumination source such as a xenon lamp with a red pas filter, illuminates a portion of the CR plate 212 and stimulates the emission of photons corresponding to trapped X-ray energy in the CR plate 212. A two-dimensional imager 144, which can be a solid-state camera, a charge coupled device (CCD) camera, a complementary metal oxide semiconductor (CMOS) camera, or a charge injection device (CID) camera, captures a two-dimensional image using the stimulated emission photons from the CR plate 212. Throughout the remainder of this document, "active area" refers to the area in scanner 200 from which imager 144 can receive stimulated emission.

In various embodiments, a dichroic filter 135 is positioned between the illumination source 116 and the CR plate 212. The dichroic filter 135 passes stimulating illumination from the illumination source 116 to the CR plate 212 and reflects stimulated emission photons from the CR plate 212. The two-dimensional imager 144 is configured to receive the stimulated emission photons reflected by the dichroic filter 135. A blue pass filter 138 may be disposed between the dichroic filter 135 and the two-dimensional imager 144 to filter the illumination and allow passage of only desirable stimulated blue light from the CR plate 212. Other devices for directing light incident on CR plate 212 and light emitted by CR plate 212 can also be used.

In various aspects, a lens system 140 is operatively connected to the two-dimensional imager 144 and can include a multi-element lens, a spatial imaging lens, a zoom lens, or a high transmission lens. The lens system 140 and the two-dimensional imager 144 can be controlled by processor 86. Processor 86 can direct the lens system 140 and the two-dimensional imager 144 to read out a region of interest on the CR plate 212 to perform sub-array imaging. Motion subsystem 150 (shown dashed for clarity) can be used to move the two-dimensional imager 144 and focus the lens system 140; motion subsystem 150 can be controlled by processor 86. Further examples of CR scanners are given in U.S. Pat. Nos. 6,894,303 and 7,244,955, each of which is incorporated herein by reference.

As shown, scanner 200 is scanning two CR plates 212, 213 simultaneously. Transport 234 carries plates 212, 213 and is configured to operatively arrange a plurality of plates (e.g., plates 212, 213) with respect to imager 144 so that a single image of the plates can be captured. Plates 212, 213 can both be present in the active area at the same time. Transport 234 can include belt 235, in this example shown traveling into the plane of the figure. A user or loading system (e.g., a robot) can place CR plates 212, 213 on belt 235. Transport 234 can then move the plates 212, 213 into the active area, i.e., into position with respect to illumination source 116 and imager 144 so that the two-dimensional image can be captured and include data corresponding to the latent images on both plates 212, 213. In other aspects, transport 234 includes at least one motorized roller, OMNI WHEEL, MECANUM wheel, or other powered conveyor, and zero or more other rollers, wheels, or other passive conveyors, to move plates 212, 213 through the active area.

In various aspects, galvanometer or polygon scanners are used to sweep a laser beam from illumination source 116 across plates in the active area. In some aspects, the laser beam is swept transverse to the direction of travel of belt 235, and images are captured while belt 235 is moving (or during pauses in otherwise continuous motion of belt 235). In this way, scanner 200 can collect an arbitrarily long image (along the direction of travel of belt 235), e.g., one row of image data (one laser sweep cycle) at a time.

It is not necessary for scanner 200 to determine locations of plates 212, 213 before scanning. Scanner 200 can perform a whole-area scan of the active area, and portions of the active area not including CR plates will not provide any stimulated emission. Image data corresponding to such portions is referred to herein as "background." Belt 235 can include a material that absorbs radiation from illumination source 116. In various aspects, scanner 200 does not include an alignment fixture, either on scanner 200 or transport 234, or on a separate plastic template or other accessory, for aligning plates 212, 213 on transport 234.

Figure 4:
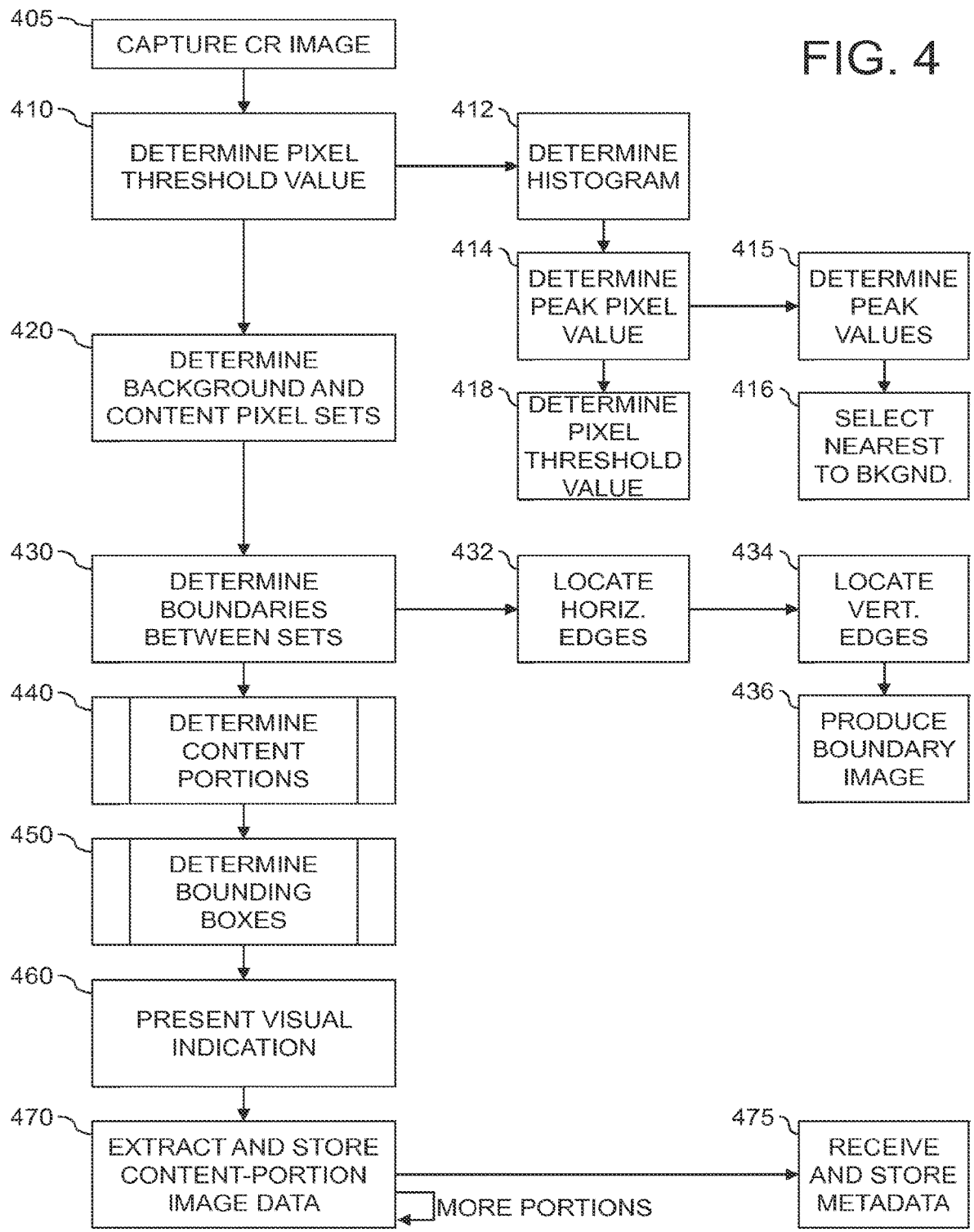
FIG. 4 is a flowchart illustrating exemplary methods for locating one or more content portions of an image.

In various aspects, processor 86 is configured to perform various processing steps on the captured image of plates 212, 213. Processor 86 is configured to determine a pixel threshold value using a plurality of pixel values in the single image so that the pixel threshold value corresponds to a background range of the pixel values. This can be done as described below with reference to step 410 (FIG. 4). Processor 86 is further configured to compare the determined pixel threshold value to the pixel values so that a background set of the pixel values and a content set of the pixel values are determined, e.g., as in step 420 (FIG. 4). Processor 86 is further configured to determine a plurality of boundaries between the background and content sets of pixel values, e.g., as in step 430 (FIG. 4). Processor 86 is further configured to determine the one or more content portions using the determined boundaries, e.g., as in step 440 (FIG. 4). Processor 86 is further configured to determine respective bounding boxes for the determined one or more content portions, e.g., as in step 450 (FIG. 4).

In various aspects, scanner 200 further includes electronic display 230. Processor 86 is further configured to automatically present on the display a visual representation of the single image and at least one of the determined bounding boxes. An example of such a representation is shown in FIG. 3 and further details are discussed with reference to step 460 (FIG. 4), both below.

In various aspects, scanner 200 further includes tangible, non-transitory computer-readable storage medium 240 or other data storage device, e.g., a hard disk or optical disk. Processor 86 is further configured to automatically extract image data corresponding to one of the content portions from the captured image and store the extracted image data in the storage medium 240.

Figure 3:
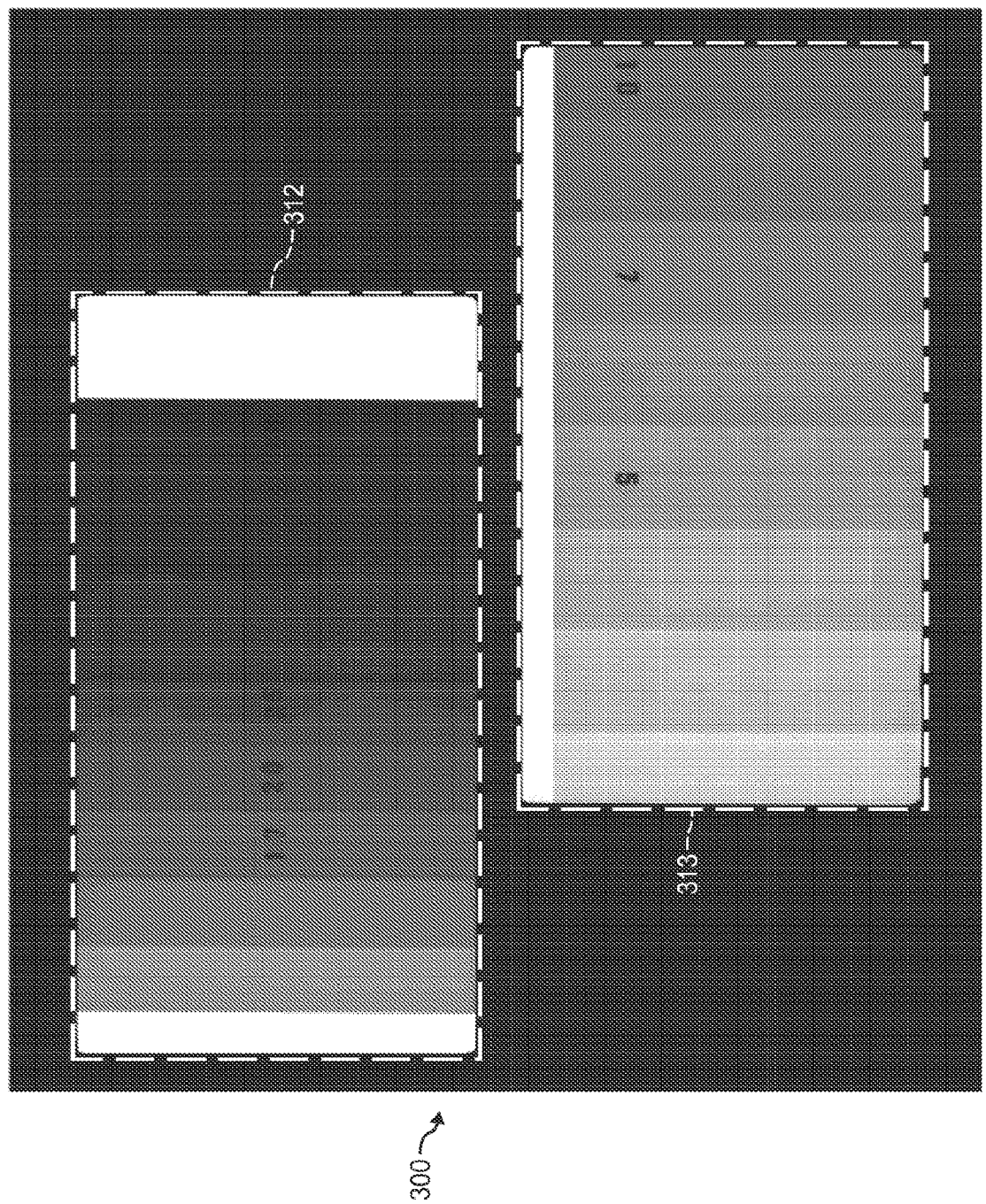
FIG. 3 is a graphical representation of an exemplary two-dimensional image captured by an exemplary CR scanner.

FIG. 3 is a graphical representation of a two-dimensional single image 300 of two plates, e.g., plates 212, 213. The single image 300 corresponds to an experimental x-ray image that was read from an exposed CR plate using a CR scanner according to various aspects. Portion 312 corresponds to plate 212, and portion 313 corresponds to plate 313. The dashed outlines delimiting portions 312, 313 have been added. As shown, each plate 212, 312 was exposed with an X-ray image of a step tablet. The actual single image 300 does not include the dashed-outline annotations for portions 312, 313. Therefore, it is desirable to determine what portions of the single image 300 correspond to plates 212, 213, respectively.

Determining portions 312, 313 permits readily retrieving image data for only one of the plates 212, 213. Determining the portions can also reduce the storage space required. Some CR scanners have resolutions on the order of 30 μm and scan widths up to 355.6 mm (14"), producing images with up to 11.9 Mpixels per row. The pixel data only of portions 312, 313 can require much less storage space than the entire image including the background data. Reducing the amount of data to be processed can also speed subsequent processing of CR images.

Some prior systems permit the user to manually identify the portions, just as the dashed outlines were manually added to this figure. However, that approach is not directly suited for batch operation, in which a potentially large number of plates is to be scanned in a short period of time. Other prior systems provide a template, e.g., a plastic frame, that can receive plates and hold them in known positions during scanning. The user can then identify the template or type of template to processor 86, e.g., by entering a code printed on the template into a user input device connected to processor 86. Processor 86 can then extract portions 312, 313 from the single image 300 using a database holding the coordinates of the portions for each type of template. This system is useful and provides improved throughput and reduced registration error compared to manual-identification devices. However, to further improve throughput, it is desirable to automatically identify the portions so that the user does not have to take time to key in the template code, and to permit using plates of various sizes even if no appropriately-sized template is available. Moreover, it may be desirable to automatically identify images to reduce the probability of the user's accidentally entering a template code that does not match the actual template in use, which can cause images of multiple plates to be mis-segregated.

Accordingly, processor 86 is configured to carry out an algorithm discussed below with reference to FIG. 4 to identify portions automatically in the image data of the single image, e.g., single image 300. The single image includes a plurality of pixels. Each pixel is located at a specific (x, y) position in the single image and has a respective pixel value. Each pixel value can be in the range, e.g., 0-255 (for an 8-bit scanner) or 0-65535 (for a 16-bit scanner). Other bit depths ≥2 can also be used, e.g., 6 bits and 10 bits. In various examples, black pixels have a pixel value near 0 and white pixels have a pixel value near the upper limit corresponding to the bit depth, e.g., 255 for 8-bit.

FIG. 4 shows a flowchart illustrating an exemplary method for locating one or more content portions of an image. Each content portion can correspond to, e.g., one plate in the active area of a CR scanner. The steps can be performed in any order except when otherwise specified, or when data from an earlier step is used in a later step. In at least one example, processing begins with step 405 or step 410. For clarity of explanation, reference is herein made to various components shown in FIGS. 1 and 2 that can carry out or participate in the steps of the exemplary method. It should be noted, however, that other components can be used; that is, exemplary method(s) shown in FIG. 4 are not limited to being carried out by the identified components. The image, e.g., single image 300 represented in FIG. 3, includes a plurality of pixel values, as discussed above. The method can include automatically performing the steps using processor 86.

In step 405, a CR image is obtained. A computed-radiography plate is interrogated with imager 144 (FIG. 2). The image is provided and corresponds to a latent image on the plate. Step 410 is next.

In step 410, a pixel threshold value is determined using the pixel values. The pixel threshold value corresponds to a background range of the pixel values. In this way, the background (e.g., the black area in single image 300, FIG. 3, outside portions 312, 313) can be separated from the non-background. The content portions are in the non-background. In various aspects, step 410 includes steps 412, 414, 415, 416, or 418, as described below. In various aspects discussed in more detail below, the pixel threshold value generally corresponds to the right-hand side of the left-most (background) peak in a histogram of the image.

In step 412, a histogram of the image is determined. The histogram includes pixel values and corresponding pixel counts and slopes. This histogram can be binned or not, and the counts can be a sum over the pixel values in each bin. Such sums can be weighted. The pixel threshold value can be selected using the histogram by various conventional techniques, e.g., balanced histogram thresholding or Otsu thresholding. An example of binning is discussed below with reference to FIG. 5.

Figure 5:
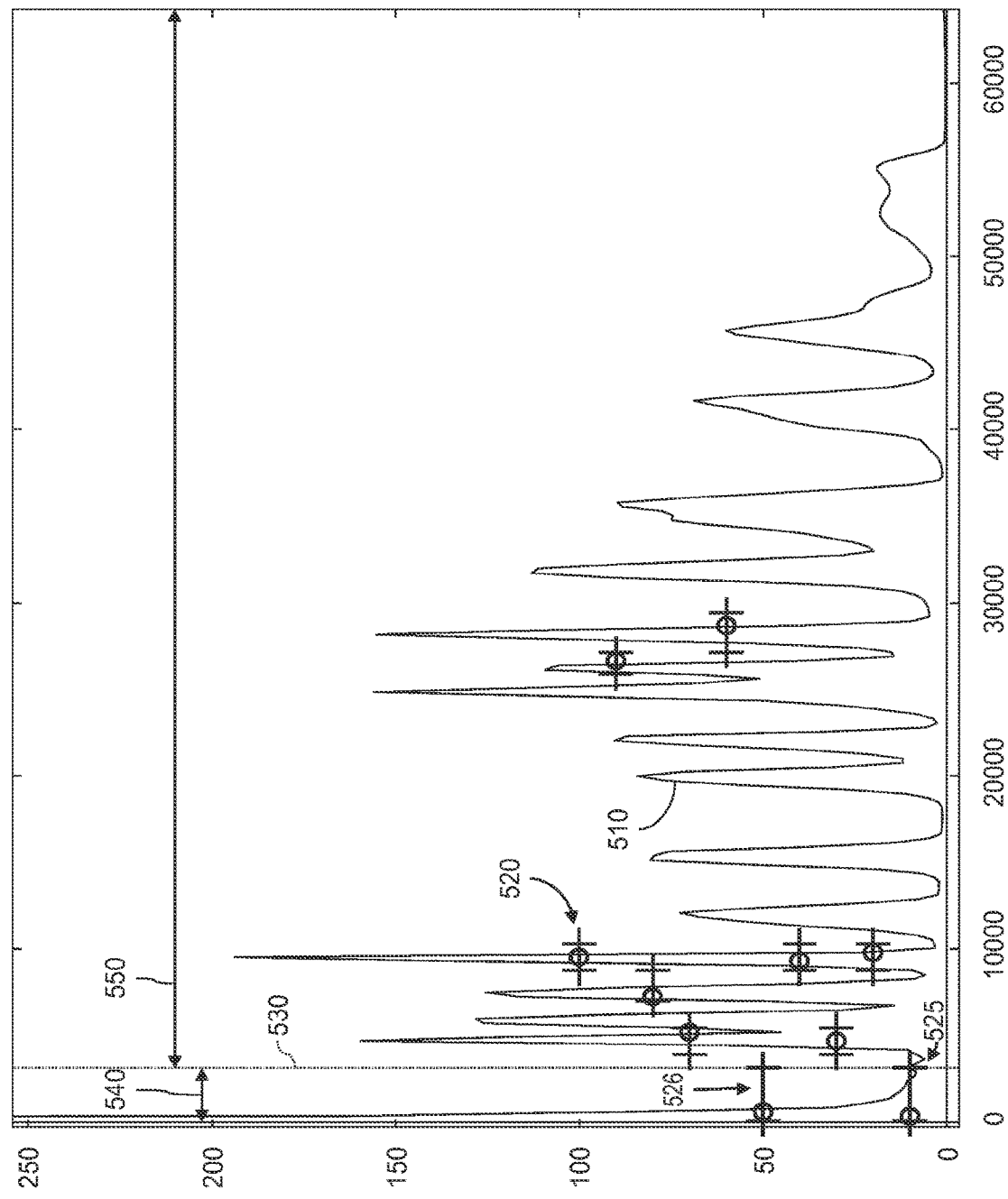
FIG. 5 shows an exemplary histogram of a CR image.

FIG. 5 shows an exemplary histogram 510 of a CR image according to various aspects. The abscissa shows 16-bit pixel value and the ordinate shows count in thousands. This plot shows a linear scale, but the vertical scale is truncated to show detail in parts of the histogram other than the highest peak, which extends to a count of 5,729,927 at a pixel value of 90. The ordinate is truncated at approximately 64260 to show detail; almost no pixels have values above 64260. This histogram shows data binned. Binning can be performed in various ways known in the statistical art. In an exemplary aspect, binning is performed by selecting a desired bin width. In the illustrated example, the bin width is 255. Then the ranges of pixel values for each bin are determined based on this bin width and the range of pixel values present in the single image. The bin number of a pixel can be determined as bin#=(pixelValue-pixelMin)/binSize. In the illustrated example, the minimum pixel value (pixelMin) is 90, the maximum pixel value (pixelMax) is 65535 and the bin size is 255. Since the minimum pixel value is 90, the first bin counts the number of pixels having values from 90 to 344, inclusive (344=90+255−1). The second bin counts pixels having values from 345 to 599, inclusive. The first or last bins can have a different size than the other bins. In this example, the last bin counts pixels having values from 65370 to 65535 (166 values). Bins can be any size ≥1. A new histogram 510 can be computed for each image processed.

Referring back to FIG. 4 and still referring to FIG. 5, in various aspects, instead of conventional techniques mentioned above, the pixel threshold is determined by identifying peak(s) in the histogram. For example, in many images, the background has many pixels in a narrow range of histogram bins, and the content regions have fewer pixels in each of a larger number of histogram bins. Accordingly, tall, narrow peaks in the histogram often represent the background. In these aspects, in step 412, for each point in the histogram, a slope (e.g., a discrete slope or difference) at that point is computed, e.g., using a backward difference operator $Va_n = a_n - a_{n-1}$ for n>1 and histogram values $a_1 \ldots a_N$. A forward difference operator or other ways of determining slopes or differences can also be used.

In step 414, a peak pixel value is determined using the slopes, so that the peak pixel value corresponds to a slope higher in magnitude than a median of magnitudes of the slopes. In various embodiments, other limits can be used in place of the median, e.g., the mean or one of the quartiles. Exemplary peak pixel values are represented with circles in markers 520, 525, which are explained further below. Markers 520, 525 are spaced apart along the ordinate for clarity only.

In various aspects, step 414 includes steps 415 and 416. In step 415, the peak pixel value is determined by determining a plurality of peak pixel values using the slopes, so that each peak pixel value corresponds to a slope higher in magnitude than a median (or mean, quartile, or other limit) of magnitudes of the slopes. In step 416, the one of the peak pixel values closest to a background pixel value (e.g., 0) is then selected as the peak pixel value. For example, the N points with the highest slopes or highest magnitudes of slopes can be selected, as discussed in more detail below.

In various aspects, in step 418, once the peak pixel value has been selected, e.g., by steps 415 and 416, a pixel value is determined of a negative-to-positive transition of the slopes. The determined pixel value is farther from the background pixel value than the determined peak pixel value. In an example, the background pixel value is 0 (zero) and the determined pixel value is the pixel value of the first such transition above the determined peak pixel value. The determined pixel value is the pixel threshold value output by step 410. If the histogram is plotted (as histogram 510 is) with the background pixel value at the left, the pixel threshold value is the right-hand side of the leftmost peak. Note that the leftmost peak can be, but does not have to be, the highest peak in the histogram.

Markers 520, 525 represent outputs of steps 414 and 418. The positions of markers 520, 525 on the ordinate were selected for clarity and are not relevant to the steps to be performed. There are 10 markers 520, 525, corresponding to the 10 pixel values in the histogram having the highest-magnitude slopes, i.e., an corresponding to the 10 highest values of $|Va_n|$ sorted in descending order. These 10 values are the peak pixel values from step 415. Any number $\geq 1$ or $\geq 2$ can be used in place of 10. Each marker 520, 525 shows a circle at the respective peak pixel value. Letting $m_n = Va_n$ (the slopes), the vertical ticks at the left and right ends of each marker 520, 525 indicate the closest pixel values to the respective peak pixel value at which the slope crosses from negative to positive, i.e., at which $m_{n-1} < 0$ and $m_n > 0$ (so $Vm_n > 0$; as noted above, other types of differences can be used). These are inflection points at the base of the peak, and so delimit the extent of the peak.

Marker 530 indicates the pixel value of the right-most extent of the left-most peak, as shown by marker 525. Accordingly, the background range 540 of the pixel values extends from the background pixel value (e.g., 0) to (or to and including) the pixel value of marker 530. The non-background range 550 of the pixel values extends from the pixel value of marker 530 (or one above that value) to the highest representable pixel value, e.g., 65535. If the background pixel value is (e.g.) 65535 rather than 0, the same steps apply, but with maximum and minimum reversed as appropriate. The highest values of $|Va_n|$ are still used, as are values with $m_{n-1} < 0$ and $m_n > 0$, but the left-hand end of each range is chosen rather than the right-hand end. Also, one range can include multiple peaks; for example, marker 526 identifies a different peak pixel value than marker 525, but the two markers cover the same range.

Referring back to FIG. 4, in step 420, the determined pixel threshold value is compared to the pixel values so that a background set of the pixel values and a content set of the pixel values are determined. In at least one aspect, step 420 includes thresholding the pixel values to produce a thresholded image in which pixels in the content set have a first pixel value (e.g., unity) and pixels in the background set have a second, different pixel value (e.g., zero). The threshold test for unity can be greater than or greater-than-or-equal-to the pixel threshold value. Steps 432, 434, 436, 710, 720, 730, and 740, described below, relate to this aspect. In other aspects, the pixel values are compared to the determined pixel threshold value and a representation is stored of, e.g., individual pixel (x,y) coordinate pairs or closed polygons that correspond to each set. Processing corresponding to the above-identified steps can be performed in other aspects with changes that will be evident to one skilled in the digital image processing art.

In various aspects, to reduce the time required to process the image, the image can be divided into chunks. Computation of the background and content sets can be performed in parallel for each image chunk. In an example, the image is divided into 8 parts, row wise. That is, the rows will be divided into 8 chunks, each with the same number of columns as the original image). The content sets determined from each image chunk are then combined together to provide the content sets for the full image, e.g., single image 300 (FIG. 3).

In various aspects, if any part of the content set touches the boundary of the single image, the edge can be determined to be the corresponding boundary of the single image itself. This can be done by assigning all boundary pixels in the single image the minimum pixel value and determining whether the gradient value crosses the threshold.

In various aspects, step 420 can include reducing the bit depth of the image either before or after thresholding. For example, each pixel value in a 16-bit image can be shifted right by eight bits ($\div 256$) to produce an 8-bit (0-255) image, the determined pixel threshold value can be shifted left by 8 bits, and the 8-bit pixel values can be thresholded with the 8-bit pixel threshold value to produce the thresholded image. This can reduce the standard deviation of the pixel values, thus reducing the sensitivity of subsequent process steps to small variations in the pixel values. Bit-depth reduction can be performed by shifting, dividing with truncation, or dividing with rounding.

In step 430, a plurality of boundaries is determined between the background and content sets of pixel values. In various aspects, step 430 includes steps 432, 434, and 436.

In step 432, one or more edges are located in the thresholded image. The located edges are aligned within a first angle range. In an example, the edges extend horizontally, as noted in FIG. 4. This can be an angle of, e.g., 85°-95° clockwise from the top of the image ("north" herein). The edges can be represented as a first edge image, an example of which is discussed below with reference to FIG. 6B. This can be done using a convolution kernel or other gradient operator; other edge-detection techniques (e.g., difference-of-Gaussians or Sobel) can be used.

In step 434, one or more further edges are located in the thresholded image. These can be vertical edges, as noted in FIG. 4. The located further edges are aligned within a second, different angle range, e.g., 175°-185°. The edges can be represented as a second edge image, an example of which is discussed below with reference to FIG. 6C. This can be done as noted above with reference to step 432.

In step 436, a boundary image is produced. Each pixel in the boundary image has a first pixel value (e.g., unity) if that pixel corresponds to any of the located edges, and has a second, different pixel value (e.g., zero) otherwise. The boundary image can also be referred to as an "edge map."

Figure 6A:
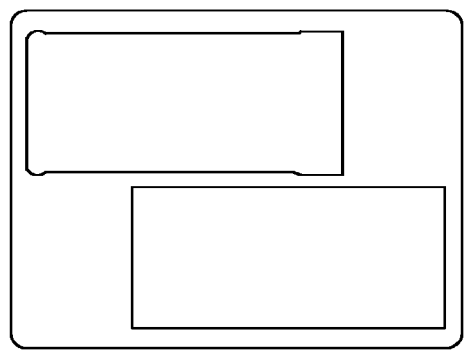
FIGS. 6A, 6B, 6C, and 6D show graphical representations of an exemplary thresholded image; exemplary horizontal and vertical edge maps; and an exemplary boundary image, respectively.
Figure 6:
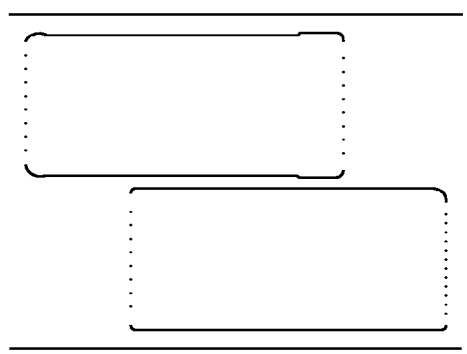
Figure 6C:
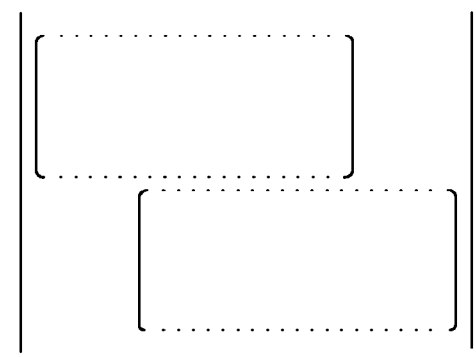
Figure 6D:
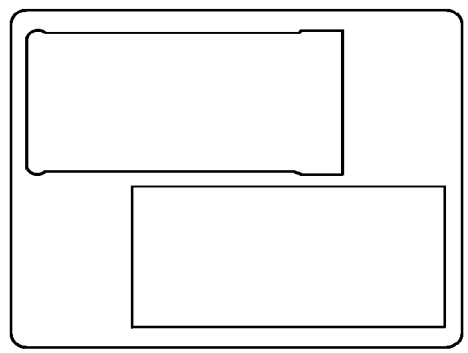

FIGS. 6A-6D show graphical representations of exemplary inputs and outputs of various processing steps. FIG. 6A shows a graphical representation of a thresholded image produced in step 420. FIGS. 6B and 6C show graphical representations of horizontal and vertical edge maps produced in steps 432, 434 respectively. FIG. 6D shows a graphical representation of a boundary image produced in step 436. FIGS. 6B and 6C used convolution kernels

|   |   |   |     |   |   |   |
|---|---|---|-----|---|---|---|
| 0 | 0 | 0 |     | 0 | 0 | 0 |
| 0 | -1| 0 | and | 0 | -1| 1 |
| 0 | 1 | 0 |     | 0 | 0 | 0 | respectively. In FIGS. 6B-6D, for purposes of clarity, convolution outputs of −1 and +1 are both represented in black, and convolution outputs of 0 are represented in white. The boundary image shown in FIG. 6D can be produced by superimposing the edge maps of FIG. 6B (step 432) and FIG. 6C (step 434), e.g., by setting each pixel of the boundary image to the first pixel value if the corresponding pixel in either the first edge map from step 432 or the second edge image from step 434 has the first pixel value.

Figure 7:
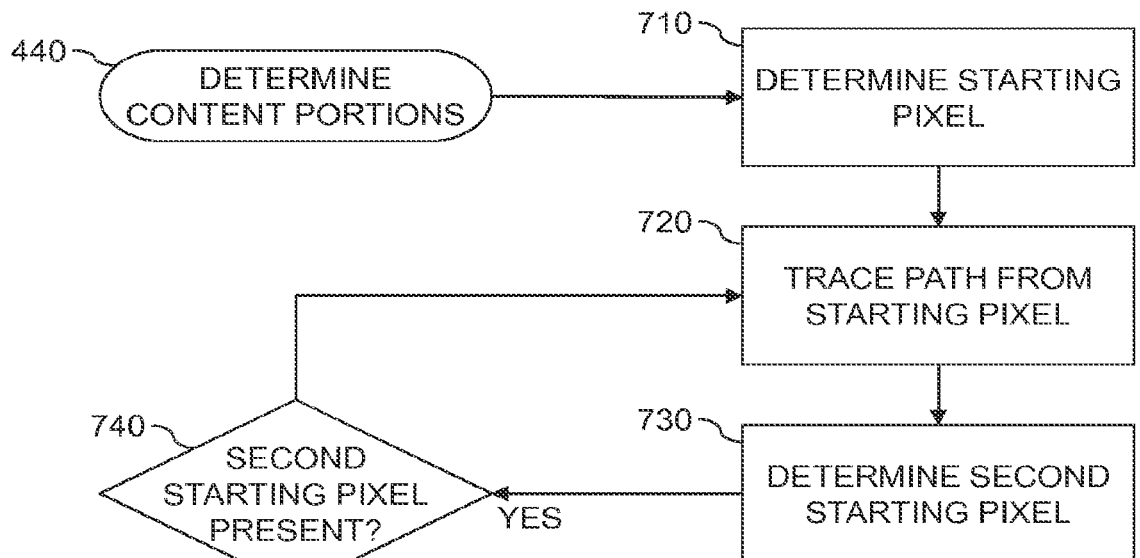
FIG. 7 is a flowchart showing details of ways of determining content portions according to various aspects.

FIG. 7 is a flowchart showing details of determining-content-portions step 440 (FIG. 4) according to various aspects. In step 440, the one or more content portions are determined using the determined boundaries. In various aspects using boundary images (edge maps) as described above, step 440 includes steps 710, 720, and 730 and decision step 740. In these aspects, the boundary pixels are grouped into continuous curves, e.g., closed curves surrounding content regions.

In step 710, a starting pixel is determined from the pixels having the first pixel value in the boundary image. This can be done, e.g., by raster-scanning the boundary image beginning at a selected corner (e.g., the top left) until a pixel having the first pixel value is reached. That pixel is then the starting pixel. If no such pixel is found, processor 86 can determine that no content is present in the single image.

In step 720, a path is traced along adjacent pixels having the first pixel value in the boundary image starting from the starting pixel and extending until the starting pixel is reached or until no adjacent pixels are available. The tracing visits each pixel in the boundary image at most once. The path thus defined includes the starting pixel. "Adjacency" is defined with reference to a selected pixel neighborhood, e.g., an eight-pixel neighborhood (3×3 pixels) or a 24-pixel neighborhood (5×5 pixels). An example of step 720 is discussed in more detail below with reference to FIG. 8.

In step 730, it is determined whether a second starting pixel is present in the pixels having the first pixel value in the boundary image and not visited during prior tracing. If so, there may be more content regions separate from the one traced starting from the determined starting pixel. The second starting pixel (if any) can be located by resuming a raster scan of the boundary image beginning from the previously-determined starting pixel, and scanning until an unvisited pixel is located.

In decision step 740, if a second starting pixel is present, the next step is step 720. Otherwise, processing of step 440 is complete. In this way, tracing step 720 and determining-second-starting-pixel step 730 are repeated so that one or more paths are defined including respective, different starting pixels, each path representative of one of the content portions. Paths can be any shape or size, e.g., as small as one pixel or as large as the entire single image.

Figure 8:
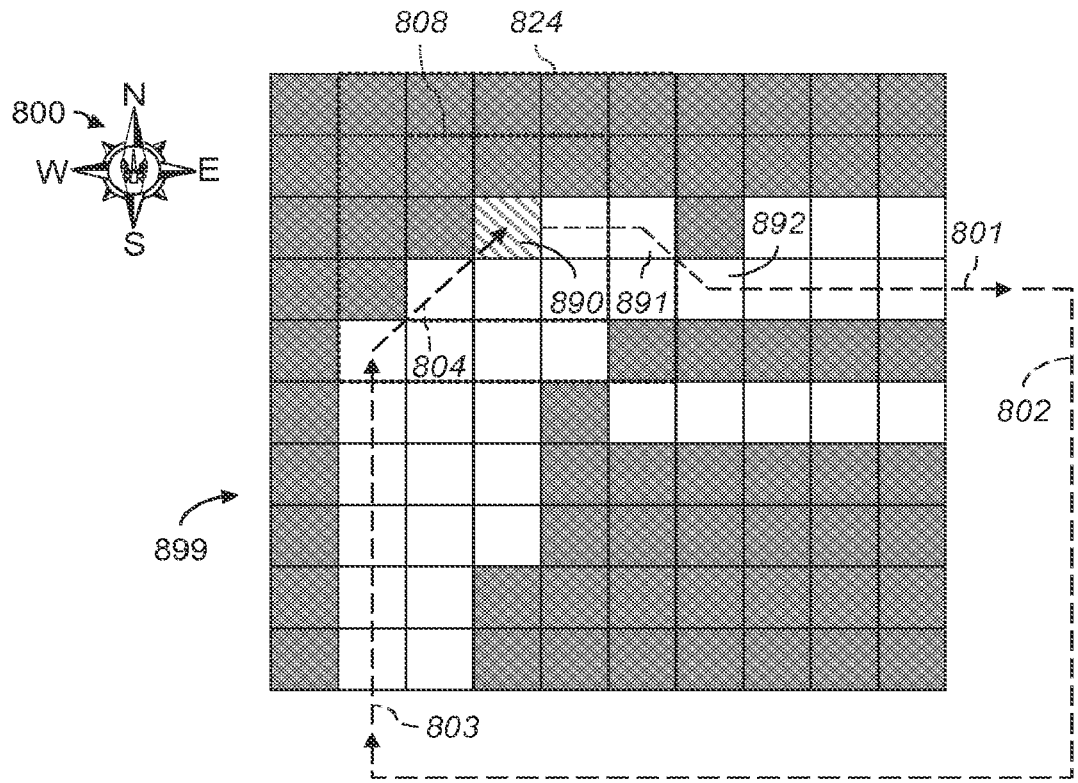
FIG. 8 shows a graphical representation of an exemplary boundary image and tracing of boundaries.

FIG. 8 shows an example of a boundary image and tracing of boundaries. Compass rose 800 shows directions used herein for ease of reference. Boundary image portion 899 is a graphical representation of a portion of a boundary image and includes pixels having the first pixel value (white), pixels having the second pixel value (hatched), and starting pixel 890 (diagonally hatched). In this example, for any given pixel, the next pixel on the path is selected from the 8-pixel neighborhood 808, if any first-valued pixel is present in the 8-neighborhood 808, or from the 24-pixel neighborhood 824, if not. The 8-neighborhood 808 and the 24-neighborhood 24 are shown for starting pixel 890. The K pixels in a path are denoted $p_k$ below, $k \in 1 \ldots K$.

At each pixel $p_k$, the next pixel is chosen so that the direction from $p_k$ to $p_{k+1}$ will be as close as possible to the direction from $p_{k-1}$ to $p_k$. For example, coming in to pixel 891, the path is moving E. Moving SE (as shown) involves less change of direction than would moving S or SW (the only other available pixels), so SE is chosen. Likewise, at pixel 892, the path is moving SE, and E is the closest available direction. From the starting pixel (k=1), the direction can be chosen according to a selected rule, e.g., the first available pixel moving clockwise from N can be used. To track whether pixels are available, pixels in the boundary image can be set to the second value as they are visited, or a list or other record of visited pixel locations can be recorded and updated as the path is traced. In an example, each time a pixel is visited, after the next pixel is selected, each pixel in the 8-pixel neighborhood is set to the second pixel value to indicate those pixels are not available.

In this example, from starting pixel 890, the path travels as indicated by arrow 801. At each step, the next adjacent non-visited first-valued (white) pixel is chosen and added to the path. This example assumes that the first-valued (white) pixels form a closed shape, e.g., as do the black pixels in FIG. 6D. This is represented by arrow 802. Consequently, the path returns to the illustrated portion of the boundary image along arrows 803, 804, 805 in that order. Since arrow 805 ends at starting pixel 890, the path is complete.

In other aspects, path changes at each pixel are subject to selected constraints. For example, the path can be constrained to select the next available pixel clockwise from N. Prior turns (e.g., turning right from the top of the path to the right side of the path) can also be remembered and subsequent turns constrained to be in the same direction.

Figure 9:
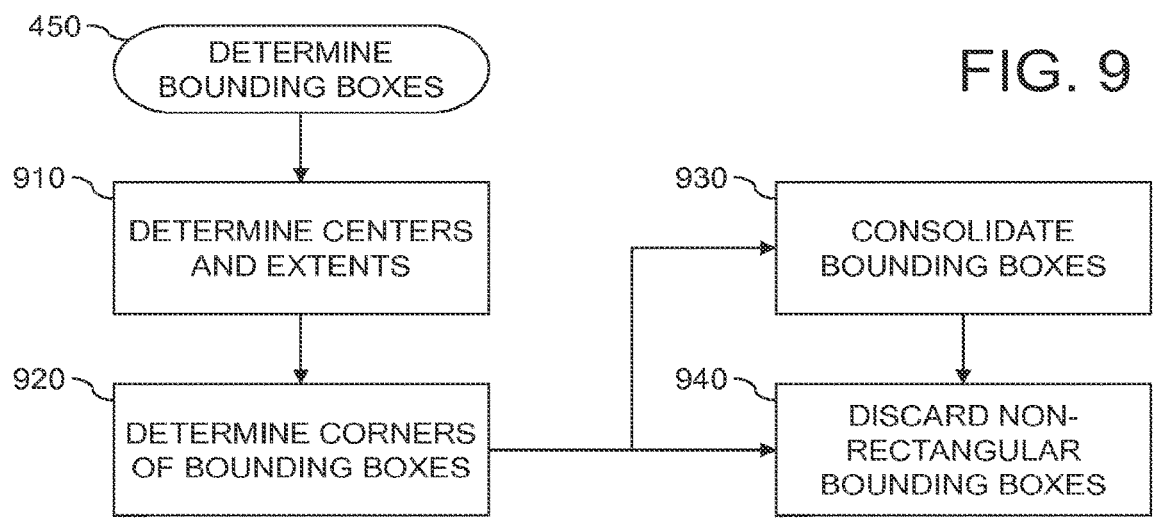
FIG. 9 is a flowchart showing details of ways of determining bounding boxes according to various aspects.

FIG. 9 shows details of various aspects of determining-bounding-boxes step 450 (FIG. 4). In step 450, respective bounding boxes are determined for the determined one or more content portions. In various aspects, step 450 is followed by step 460 or step 470, discussed below. It is not required that the paths delimit closed curves; if they do not, step 930 can be used after individual bounding boxes are determined for some or all of the non-closed paths, or for some or all of the paths.

In step 910, respective centers and respective extents of the paths are determined. Centers and extents can be determined for some or all of the paths traced in step 440. In an example, the horizontal and vertical pixel extents of each path are compared to respective thresholds, and only paths having each extent above the respective threshold are selected for processing in step 910 and subsequent steps.

In various aspects, step 910 includes computing respective centroids, respective orientations, and respective extrema of pixel locations of each of the paths. Centroids can be computed by determining the first-order moments of each path. For example, the quotient of the sum of the X coordinates of all pixels in the path and the number of such pixels is the X coordinate of the centroid, and likewise for the Y coordinate. The orientations can be computed using second order moments, as is well known in the image-processing art. The extrema can be computed by determining the minimum and maximum of the X coordinates of the pixels in the path, and likewise the minimum and maximum of the Y coordinates.

In various aspects, step 910 includes computing the aspect ratio and major and minor axes for each path. This can be done using second order moments, as is well known in the image-processing art. The center of the path is taken to be the intersection between the major and minor axes.

In step 920, corners of the bounding boxes are determined using the centers and extents, so that each bounding box encloses a respective one of the paths. This is discussed in more detail below with reference to FIG. 10. In various aspects, step 920 is followed by step 930 or by step 940.

In step 930, overlapping bounding boxes, if any, are consolidated. Bounding rectangles entirely contained within other bounding rectangles are removed. Intersecting bounding rectangles are replaced with a new bounding rectangle that encloses all the intersecting bounding rectangles, e.g., the smallest such new bounding rectangle. These steps can be performed in various orders. In various aspects, step 930 is followed by step 940.

In step 940, it is determined whether each bounding box is substantially rectangular, e.g., using the determined corners or axes. It is further determined that each path corresponds to a content portion if and only if the corresponding bounding box is substantially rectangular. In an example, the angle (or dot product) between the major and minor axes is computed. If the major and minor axes are substantially perpendicular, e.g., 90±5°, it is determined that the bounding box is rectangular. Non-rectangular bounding boxes can be disregarded, discarded from memory, or otherwise not processed further.

Figure 10:
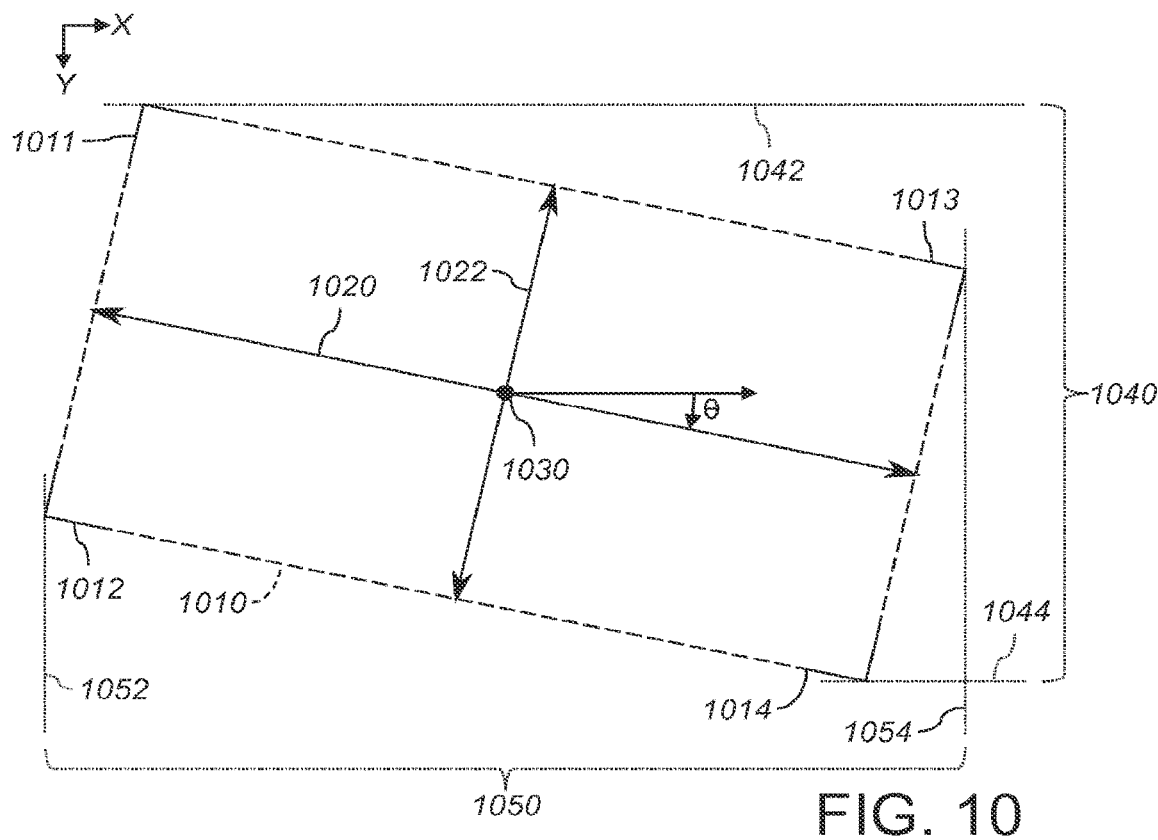
FIG. 10 is an illustration of an exemplary bounding box and geometric properties thereof.

FIG. 10 shows an exemplary bounding box 1010 with corners 1011, 1012, 1013, 1014. For clarity of explanation, and without limitation, bounding box 1010 corresponds to a perfectly rectangular plate 212 rotated with respect to the X and Y axes of the single image from imager 144. Bounding box 1010 has major axis 1020, minor axis 1022, and centroid 1030. In this example, axes 1020, 1022 are parallel and axis 1020 has an orientation θ with respect to the X axis. Bounding box 1010 covers pixels in the single image in range 1040, from row 1042 to row 1044, in the Y direction, and in range 1050, from column 1052 to column 1054, in the X direction. Various of the illustrated quantities can be determined from others of those quantities, as is known in the geometric art. For example, given centroid 1030, orientation θ, and ranges 1040, 1050, and assuming the region is substantially rectangular, the major and minor axes are uniquely determined. The axes can then be translated to the bounds to determine the corners. For example, minor axis 1022 can be translated to terminate at row 1042 and column 1052, or to terminate at row 1044 and column 1054. The bounding-box corners are at the endpoints of the translated minor axis 1022. Using moment (moment of inertia) computations permits accurately detecting properties of plates rotated with respect to imager 144 even if the rotation renders information in ranges 1040, 1050 less directly representative of the region of interest.

Referring back to FIG. 4, in step 460, a visual indication of at least one of the determined bounding boxes is presented on a display. Examples of such an indication are the dashed outlines shown in FIG. 3 around portions 312, 313. Processor 86 can cause display 30 to show the captured image, overlaid with outlines, corner fiducials, or other marks representing the bounding boxes. The bounding boxes can be represented to scale with the images so that a user can readily ascertain whether the algorithm has correctly identified the content portions. In aspects using step 930 (FIG. 9), visual indication(s) can be presented for one or more bounding box(es) determined to correspond to respective content portion(s).

In step 470, image data corresponding to one of the content portions are automatically extracted from the image (the single image) and stored in a tangible, non-transitory computer-readable storage medium, e.g., as discussed below with reference to FIG. 11. Step 470 can be repeated to extract data for more than one content portion, as indicated. Step 470 can include rotating the extracted image data to align the major and minor axes of the content portion with the X and Y axes, or the extracted data can be stored as captured (e.g., oriented at angle θ, FIG. 10). Step 470 can be followed by or can include step 475.

In step 475, metadata corresponding to the one of the content portions are received and stored in association with the extracted image data in the storage medium. For example, Digital Imaging and Communication in Nondestructive Evaluation (DICONDE) standard attributes and corresponding values can be received and stored in a disk file along with the extracted image data. Examples of attributes include: the name and serial number of the component whose image is shown in the content portion; environmental conditions at the time of capture (X-ray exposure); and identifying information of the CR scanner or capture device. Processor 86 can receive common metadata and apply that metadata to a plurality of content portions in a single image or can receive metadata specific to one content portion, in any combination. In an example, plates 212, 213 (FIG. 2) have the same capture date and CR scanner information, but have different metadata identifying the imaged component.

Still referring to FIG. 4, there is further illustrated a method of locating one or more content portions of an image according to various aspects. The image includes a plurality of pixel values, as discussed above. The method includes automatically performing the below-identified steps using a processor.

A pixel threshold value is determined using the pixel values. This can be done, e.g., as described above with reference to step 410. Other ways of determining the pixel threshold value can also be used.

A plurality of boundaries between portions in the image data is determined. The portions are delimited by the pixel threshold value. This can be done as described above with reference to step 430. Other ways of determining boundaries can also be used. For example, boundaries can be identified as crossings of the threshold value while raster-scanning the image. The boundaries can be saved. This permits determining boundaries without using storage space for, e.g., a thresholded image or other representation of the pixels, as opposed to the boundaries.

The one or more content portions are determined using the determined boundaries. This can be done as described above with reference to step 440 and to FIG. 7.

Respective bounding boxes are determined for the determined one or more content portions. This can be done as described above with reference to step 450 and to FIG. 9.

Suitable modifications to the above-described steps can be made based on the representation used for storing the information about the boundaries, as will be apparent to one skilled in the computer-science art.

Figure 11:
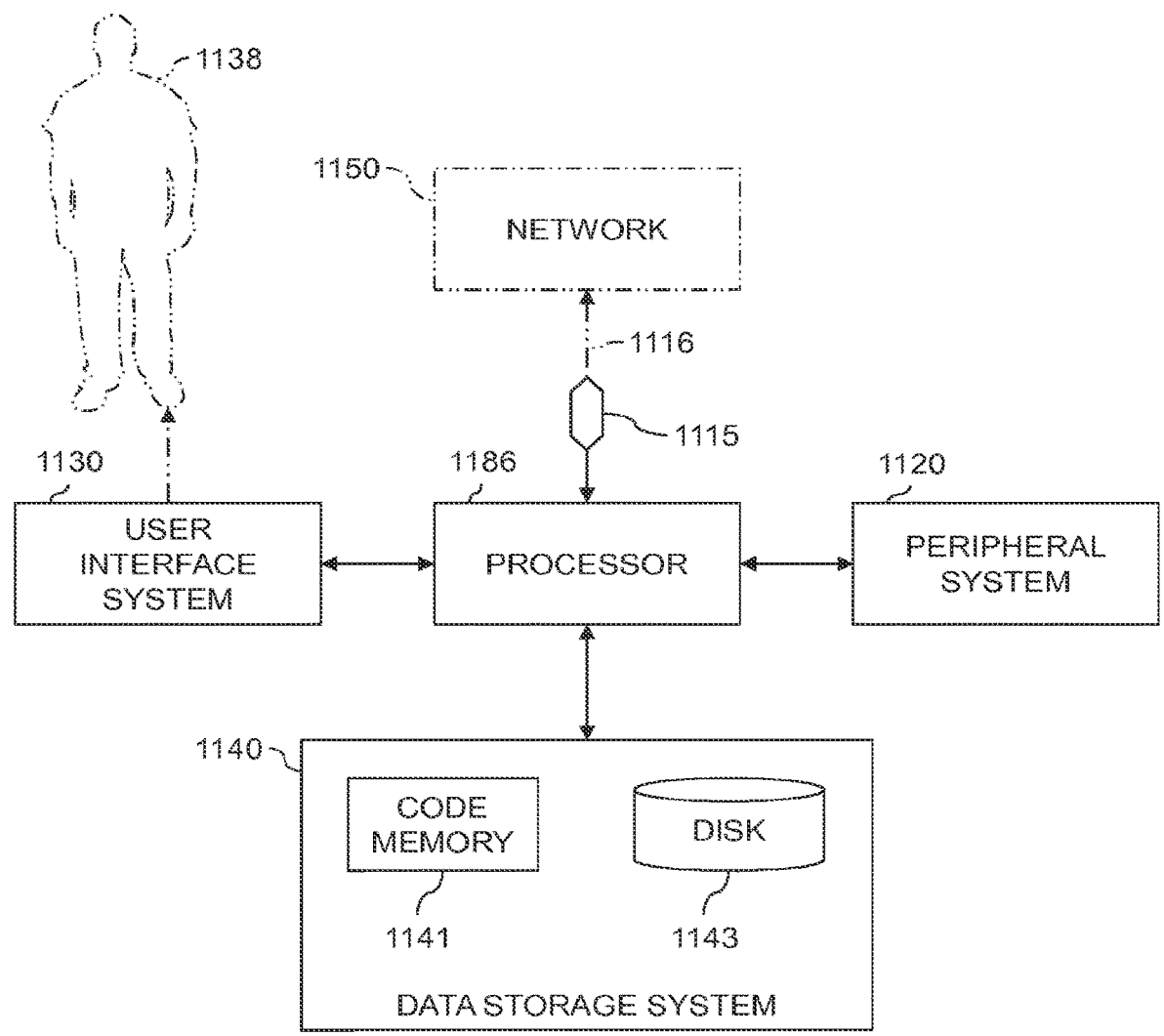
FIG. 11 is a schematic diagram showing the components of a data-processing system according to various aspects.

FIG. 11 is a high-level diagram showing the components of an exemplary data-processing system for analyzing data and performing other analyses described herein, and related components. The system includes a processor 1186, a peripheral system 1120, a user interface system 1130, and a data storage system 1140. The peripheral system 1120, the user interface system 1130 and the data storage system 1140 are communicatively connected to the processor 1186. Processor 1186 can be communicatively connected to network 1150 (shown in phantom), e.g., the Internet or an X.25 network, as discussed below. Processor 86 (FIG. 1) can be or include one or more of systems 1186, 1120, 1130, 1140, and can connect to one or more network(s) 1150. Processor 1186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1186 can implement processes of various aspects described herein, e.g., as described above with reference to FIGS. 4, 7, and 9. Processor 1186 can be embodied in one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 1120, user interface system 1130, and data storage system 1140 are shown separately from the processor 1186 but can be stored completely or partially within the processor 1186.

The peripheral system 1120 can include one or more devices configured to provide digital content records to the processor 1186. For example, the peripheral system 1120 can include digital still cameras, digital video cameras, cellular phones, or other data processors. The processor 1186, upon receipt of digital content records from a device in the peripheral system 1120, can store such digital content records in the data storage system 1140.

The user interface system 1130 can include a mouse, a keyboard, another computer (connected, e.g., via a network or a null-modem cable), or any device or combination of devices from which data is input to the processor 1186, e.g., by user 1138 (shown in phantom). The user interface system 1130 also can include a display device, a processor-accessible memory, or any device or combination of devices to which data is output by the processor 1186. The user interface system 1130 and the data storage system 1140 can share a processor-accessible memory.

In various aspects, processor 1186 includes or is connected to communication interface 1115 that is coupled via network link 1116 (shown in phantom) to network 1150. For example, communication interface 1115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1115 sends and receives electrical, electromagnetic or optical signals that carry digital or analog data streams representing various types of information across network link 1116 to network 1150. Network link 1116 can be connected to network 1150 via a switch, gateway, hub, router, or other networking device.

Processor 1186 can send messages and receive data, including program code, through network 1150, network link 1116 and communication interface 1115. For example, a server can store requested code for an application program (e.g., a JAVA applet) on a tangible non-volatile computer-readable storage medium to which it is connected. The server can retrieve the code from the medium and transmit it through network 1150 to communication interface 1115. The received code can be executed by processor 1186 as it is received, or stored in data storage system 1140 for later execution.

Data storage system 1140 can include or be communicatively connected with one or more processor-accessible memories configured to store information. The memories can be, e.g., within a chassis or as parts of a distributed system. The phrase "processor-accessible memory" is intended to include any data storage device to or from which processor 1186 can transfer data (using appropriate components of peripheral system 1120), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1140 can be a tangible non-transitory computer-readable storage medium, i.e., a non-transitory device or article of manufacture that participates in storing instructions that can be provided to processor 1186 for execution.

In an example, data storage system 1140 includes code memory 1141, e.g., a RAM, and disk 1143, e.g., a tangible computer-readable rotational storage device such as a hard drive. Computer program instructions are read into code memory 1141 from disk 1143. Processor 1186 then executes one or more sequences of the computer program instructions loaded into code memory 1141, as a result performing process steps described herein. In this way, processor 1186 carries out a computer implemented process. For example, steps of methods described herein, blocks of the flowchart illustrations or block diagrams herein, and combinations of those, can be implemented by computer program instructions. Code memory 1141 can also store data, or can store only code.

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1186 (and possibly also other processors), to cause functions, acts, or operational steps of various aspects herein to be performed by the processor 1186 (or other processor). Computer program code for carrying out operations for various aspects described herein may be written in any combination of one or more programming language(s), and can be loaded from disk 1143 into code memory 1141 for execution. The program code may execute, e.g., entirely on processor 1186, partly on processor 1186 and partly on a remote computer connected to network 1150, or entirely on the remote computer.

In view of the foregoing, embodiments analyze image data, e.g., CR image data, to determine content regions. Various aspects further extract image data of those content regions for storage. A technical effect of various aspects is to present a visual indication on a display of the identified content regions. A further technical effect of various aspects is to store or transmit via a network the extracted image data.

The application is inclusive of combinations of the aspects described herein. References to "a particular aspect" and the like refer to features that are present in at least one aspect. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The embodiments have been described in detail with particular reference to certain aspects thereof, but it will be understood that variations, combinations, and modifications can be effected by a person of ordinary skill in the art within the spirit and scope of the application. Examples of variations, combinations, and modifications that are intended to be within the scope of the claims are those having structural elements that do not differ from the literal language of the claims and those including equivalent structural elements with insubstantial differences from the literal language of the claim.

The invention claimed is:

1. A system for locating one or more content portions of an image, the system comprising:
an illumination source;
a dichroic filter positioned between the illumination source and one or more computed radiography plates;
a two-dimensional imager configured to receive stimulated emission photons reflected from the dichroic filter, the two-dimensional imager coupled to a lens system;
a transport configured to operatively arrange the one or more computed radiography plates with respect to the two-dimensional imager so that an image of one or more plates can be captured by the two-dimensional imager;
a processor, operatively coupled to the two-dimensional imager, the processor configured to automatically:
receive a plurality of pixel values, the pixel values characterizing the image captured by the two-dimensional imager;
determine a pixel threshold value using the plurality of pixel values characterizing the image captured by the two-dimensional imager so that the pixel threshold value corresponds to a background range of the pixel values;
store a representation including individual pixel coordinate pairs in response to determining the pixel value threshold, the representation stored in a tangible, non-transitory computer-readable medium coupled to the processor;
compare the determined pixel threshold value to the pixel values so that a background set of the pixel values and a content set of the pixel values are determined;
determine a plurality of boundaries between the background and content sets of pixel values;
determine the one or more content portions using the determined boundaries; and
determine respective bounding boxes for the determined one or more content portions.

2. The system of claim 1, wherein the illumination source is a laser.

3. The system of claim 1, wherein a blue pass filter is disposed between the dichroic filter and the two-dimensional imager.

4. The system of claim 1, further comprising a motion sub-system coupled to the processor, the motion sub-system including a data processor and configured to position the two-dimensional image and focus the lens system with regard to a region of interest associated with the computed radiography plates to perform sub-array imaging.

5. The system of claim 1, wherein the two-dimensional imager includes a solid-state camera, a charge coupled device (CCD) camera, a complementary metal oxide semiconductor (CMOS) camera, or a charge injection device (CID) camera.

6. The system of claim 2, wherein a galvanometer scanner is used to direct a beam from the laser in a transverse direction with respect to a direction of travel of the transport.

7. The system of claim 1, wherein the processor is further configured to determine pixel threshold value by:
determining a histogram of the image, the histogram including pixel values and corresponding pixel counts and slopes; and
determining a peak pixel value using the slopes, so that the peak pixel value corresponds to a slope higher in magnitude than a median of magnitudes of the slopes.

8. The system of claim 7, wherein determining the histogram includes binning the histogram and determining the pixel counts as a sum of the pixel values in each bin.

9. The system of claim 8, wherein the sum of the pixel values in each bin are weighted.

10. The system of claim 7, wherein the processor is further configured to determine the peak pixel value by:
determining a plurality of peak pixel values using the slopes, so that each peak pixel value corresponds to a slope higher in magnitude than a median of magnitudes of the slopes; and
selecting the one of the peak pixel values closest to a background pixel value as the peak pixel value.

11. The system of claim 1, wherein the processor is further configured to automatically provide a visual indication of at least one of the determined bounding boxes on a display.

12. The system of claim 1, wherein the processor is further configured to automatically extract image data corresponding to one of the content portions from the image and storing the extracted image data in a tangible, non-transitory computer-readable storage medium.

13. The system of claim 1, wherein the processor is further configured to automatically extract image data corresponding to one of the content portions from the image and store the extracted image data in a tangible, non-transitory computer-readable storage medium coupled to the processor.

14. The system of claim 1, wherein the representation includes individual pixel coordinate pairs associated with a content set of pixel values and individual pixel coordinate pairs associated with a background set of pixel values.

15. The system of claim 1, wherein processor is further configured to divide the image into chunks and determine a content set of pixel values and a background set of pixel values for each image chunk in parallel.

16. The system of claim 1, wherein the processor is further configured to reduce a bit depth of the pixel values in the image prior to determining the pixel value threshold.

17. The system of claim 16, wherein the bit depth reduction is performed by shifting, dividing with truncation, or dividing with rounding.

18. The system of claim 1, wherein the transport includes a belt for conveying the computed radiography plates into position with respect to the two-dimensional imager.

19. The system of claim 1, wherein the transport includes a plurality of rollers for conveying the computed radiography plates into position with respect to the two-dimensional imager, the plurality of rollers including motorized rollers and/or passive conveyors.

* * * * *